United States Patent [19]

Ellis, Jr. et al.

[11] Patent Number: 4,890,225

[45] Date of Patent: Dec. 26, 1989

[54] METHOD AND APPARATUS FOR BRANCHING ON THE PREVIOUS STATE IN AN INTERLEAVED COMPUTER PROGRAM

[75] Inventors: Ronald M. Ellis, Jr., Wilton, N.H.; Oren L. Wiesler, Acton, Mass.; Christopher A. Mega, Wilton, N.H.

[73] Assignee: Digital Equipment Corporation, Maynard, Mass.

[21] Appl. No.: 176,607

[22] Filed: Apr. 1, 1988

[51] Int. Cl.[4] .............................................. G06F 9/42
[52] U.S. Cl. .................................. 364/200; 364/261.3
[58] Field of Search .................... 364/200, 300, 900

[56] References Cited

U.S. PATENT DOCUMENTS 4,742,466  5/1988  Ochiai et al. ..................... 364/200

Primary Examiner—Raulfe B. Zache
Attorney, Agent, or Firm—Kenyon & Kenyon

[57] ABSTRACT

A method and arrangement for causing both flows of an interleaved computer program to conditionally branch upon satisfaction by a machine state of the condition. By saving for at least one cycle the machine state which satisfied the condition for branching in the first flow, the second flow can then also branch on this saved machine state or condition. Since both flows branch on the same condition, the flows of the program can be kept together, thereby simplifying programming, even for those machines which have dynamic state conditions that can be branched on.

13 Claims, 2 Drawing Sheets

METHOD AND APPARATUS FOR BRANCHING ON THE PREVIOUS STATE IN AN INTERLEAVED COMPUTER PROGRAM

FIELD OF THE INVENTION

The present invention relates to the field of computer hardware and specifically to a method and apparatus for causing both flows of an interleaved computer program to branch upon the same machine state occurring in the computer.

BACKGROUND OF THE INVENTION

A sequencer is a component in a computer which tells the computer what is the address of the next instruction to be performed in a program. The sequencer can step through programs via an interleaved control store which contains the sequence and control for branching and subroutines. With modern random access memory (RAM) technology and fast CPU times, the time it takes to get the next address takes two CPU cycles. However, it is desirable to have a control store look-up every CPU cycle in order to achieve increased performance. Therefore, a microcode program is often "interleaved", so that during the performance of the first instruction, a second instruction is begun. The first instruction will point to the address of the next (the third) instruction which is begun during the performance of the second instruction. Similarly, the second instruction points to the address of the next (fourth) instruction which is begun during the performance of the third instruction. A program in which one instruction points to the next instruction is commonly known as a linked listing.

As should be evident from the above, the first and third instructions know nothing of the second and fourth instructions and vice versa. It is therefore conceivable to have two distinct program flows going their separate ways, neither one having anything to do with each other. However, in practice, the two flows should stay together as part of one program so that coding for the programmer does not become overly convoluted.

One of the functions of the sequencer is to respond to changes in the state of the machine. The sequencer can respond to a specified state by microbranching to another address to get the next microinstruction. If the sequencer does a microbranch, without doing anything more, then the two interleaved flows will become separated because one flow has microbranched and the other flow will know nothing about this microbranch. This would make microcoding extremely difficult. The prior art solution to this problem has been to change the address of the instruction in the non-branching flow based on the instruction from which the program branched in the branching flow so that the previously non-branching flow will now follow the branching flow. That solution cuts in half the available addresses for the allocator, as will be explained in more detail later.

SUMMARY OF THE INVENTION

It is an objective of the present invention to tie the flows of an interleaved program together so that one flow will follow another flow which has branched without reducing the number of addresses available to the allocator for assigning branch locations.

Another objective of the invention is to provide an arrangement which will cause the second flow in an interleaved program to branch on the same condition as the first flow, even for dynamic states.

These and other objectives of the present invention are provided by an arrangement in a computer for conditionally changing destination addresses of an interleaved computer program having first and second flows of instructions and conditional branching, the computer having branch states, the arrangement comprising means for sensing when a branch state of the computer satisfies a branch condition of the program, means for changing the destination address of an instruction in the first flow in response to satisfaction of the branch condition by the sensed branch state, and means for saving the sensed branch state and changing the destination address of an instruction from the second flow in response to satisfaction of the branch condition by the sensed branch state.

The above-mentioned objectives and other objectives of the present invention are also provided for by a method for conditionally branching both first and second flows of an interleaved computer program in a computer having branch states, the method comprising the steps of generating a first flow destination address from an instruction in the first flow, changing the first flow destination address if the branch state satisfies a branch condition, saving said branch state for at least one machine cycle, generating a second flow destination address from an instruction in the second flow, and changing the second flow destination address if this saved branch state satisfies the branch condition.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings.

DETAILED DESCRIPTION

Figure 1:
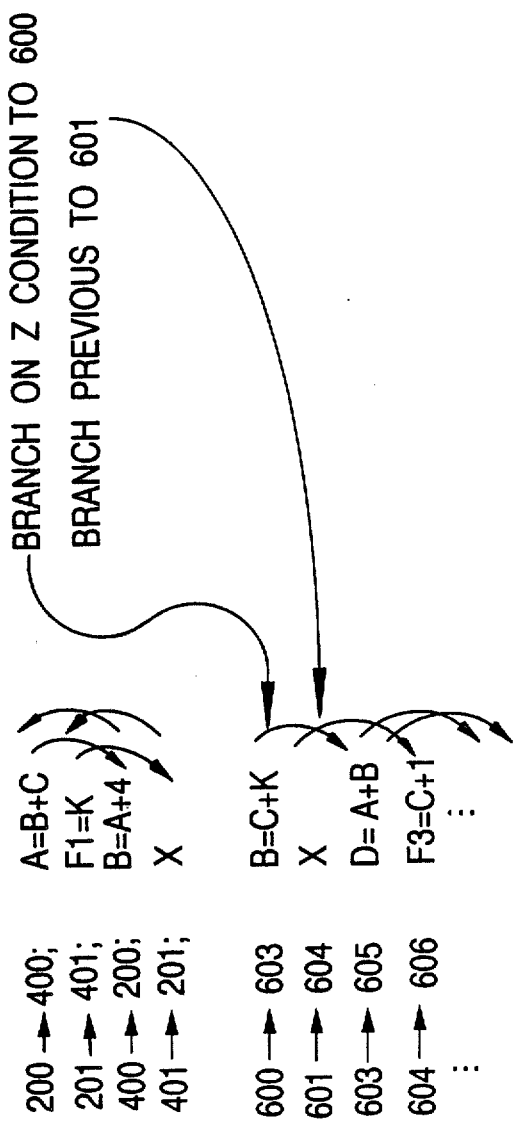
FIG. 1 shows an example of some instructions from a computer microprogram in which conditional branching is performed according to the present invention.

FIG. 1 illustrates the interleaving of a computer microprogram. For the sake of discussion, the prefix "micro-" has been dropped in the following description, so that terms such as "instruction" and "coding" mean microinstruction and microcoding, respectively. Instruction 200 points to instruction 400 in FIG. 1.

While the machine is performing instruction 200, the function A=B+C, and then pointing to instruction 400, the machine has begun performing instruction 201. During the time that instruction 201 is being performed, instruction 400 has been addressed and the machine starts performing instruction 400. Finally, during the time that instruction 400 is being performed, the machine starts performing instruction 401.

This can continue on down the program, but in the example shown, instruction 400 points back to instruction 200, and instruction 401 back to instruction 201. Therefore, two loops are formed, one between instruction 200 and 400 in the first flow, and another between instructions 201 and 401 in the second flow. The program would remain in these loops unless there was a way to break free of the loops. In order to keep the two flows together during the looping, the two loops are preferably kept the same length. The device used to break free of the loops is a conditional branch.

The machine may have many conditions (or states) representing various machine states. For example, one of these conditions or states may indicate whether a counter has been decremented to zero. Until that condition is satisfied, the program will remain in its loops. When the machine enters into the specified condition or state, the program will then branch to a new address in the program, such as instruction number 600 in FIG. 1. The first flow of instructions can proceed from there, but the second flow has to be informed of the branch in order to follow the first flow.

Although it would seem to be a simple matter to set the second flow of instructions to branch on condition Z as does the first flow, a complication arises because of what is termed dynamic state. Throughout the machine there exist pieces of state that are collected or determined as instructions are processed. Some of this state is valid for many cycles after it is set and is therefore considered static state. However, some other of this state is valid for only one cycle and is therefore considered dynamic state. Since a branch condition for the first flow may be dynamic state, that state will not be valid in the next cycle after the branch in the first flow, which is the first opportunity for the second flow to see the particular state which caused the branching of the first flow. Thus, it is not enough to simply have a branch on Z condition for instruction 201 like there is for instruction 200, since after the first flow has branched, the state which caused the branch may no longer be valid (if it is dynamic state) so that the second flow will not likewise branch. The flows will then become separated.

In order to allow the second flow to know that a state occurred which caused the first flow to branch, the present invention provides a BRANCH PREVIOUS instruction which causes the second flow to branch on the same condition that caused the first flow to branch. To account for dynamic state, the state of the previous cycle must be saved for one cycle so that the BRANCH PREVIOUS instruction can see the dynamic state on which the first flow had branched. Thus, the same state, even if dynamic, will cause both flows to branch and they will then be kept together. In FIG. 1, after the Z condition has been satisfied, the first flow branches from instruction 200 to instruction 600.

The Z state is saved for one cycle and the BRANCH PREVIOUS causes the second flow to branch from instruction 201 to 601, thereby keeping both flows together.

Figure 2:
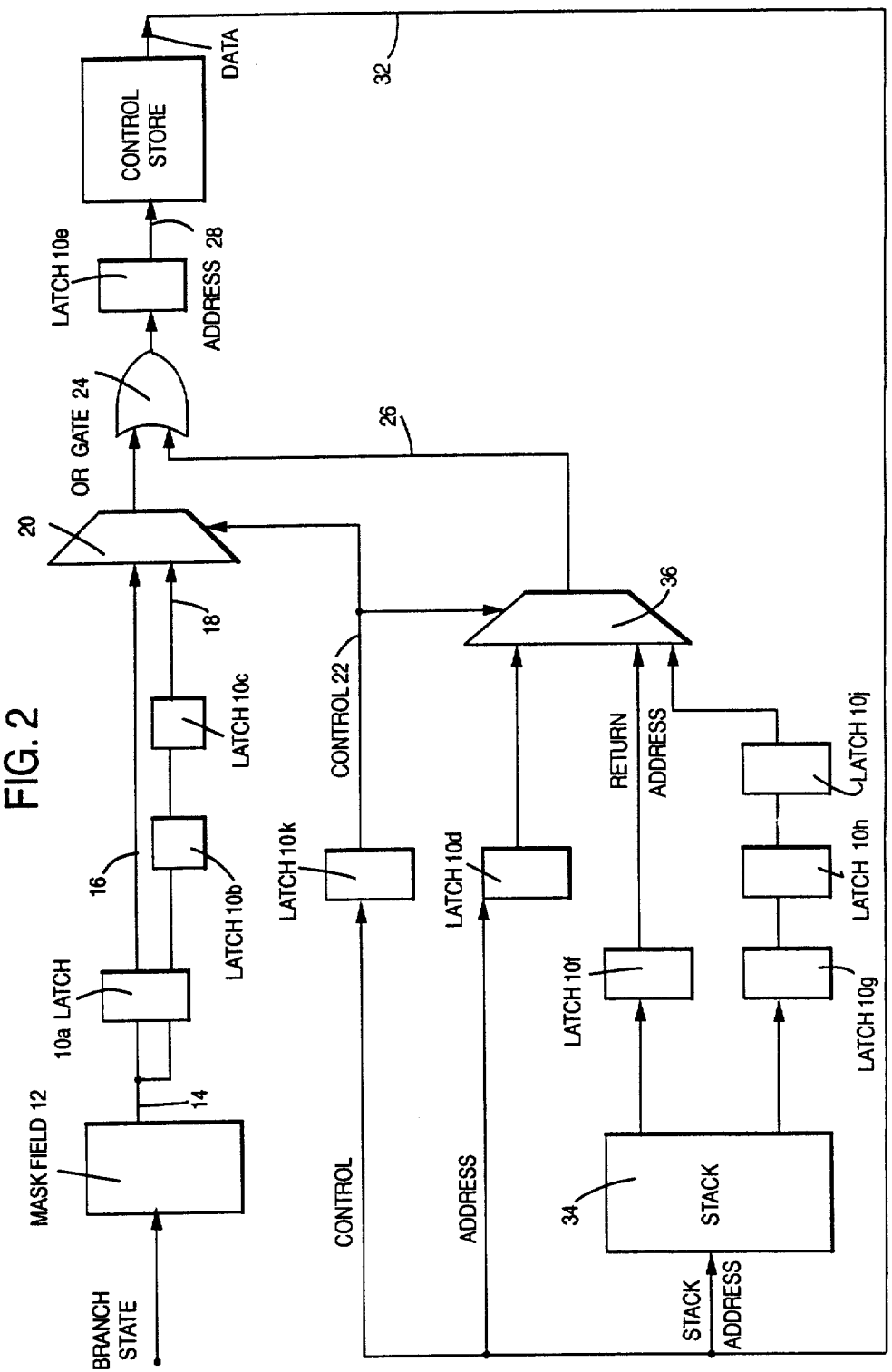
FIG. 2 shows an embodiment of the present invention for performing conditional branching of both flows of an interleaved computer program.

An exemplary embodiment of the hardware to implement the invention is shown in FIG. 2. In this Figure, latches are all designated with reference numeral 10. Latch 10a receives the branch state from a mask field 12 which turns off unwanted microbranch conditions so that only the desired branch condition or state reaches latch 10a over line 14.

Two lines 16 and 18 connect a latch 10a to a multiplexer 20 which is controlled by signals on multiplexer control line 22. Line 16 is the current state line and feeds the multiplexer 20 with the current state of the machine. Line 18 is the previous state line and feeds the previous state of the machine to multiplexer 20.

Two latches 10b, 10c in line 18 delay the input from latch 10a so that the state fed to the multiplexer 20 is one cycle behind the state on line 16. According to the selection signal on multiplexer control line 22, the multiplexer 20 outputs either the current state or the previous state of the machine.

The multiplexer 20 output is connected to one input of an OR-gate 24, whose other input is connected to a destination address line 26. As stated earlier, one address will point to the next address (or destination address). It is this destination address that is latched in latch 10d and sent to OR-gate 24. Unconditional branching simply uses the destination address as the next address. For conditional branching, the destination address is altered by ORing in gate 24 the state codes from the rest of the machine. A certain number of the bits in the destination address, such as four of the bits, are changed by OR-gate 24 so that the destination address will be changed. A 16-way branching by the microcode is allowed if four bits are changed, for example.

After the destination address inputted into OR-gate 24 has been altered, it is outputted as an address on address line 28 which has a latch 10e. The address line 28 carries the address to a control store 30 which generates data that causes actions in the rest of the machine. The data is also fed back over line 32 to lines 22 and 26, this data containing the destination address and the control for the multiplexer 20.

The control sent by the control store 30 over the multiplexer control line 22 causes the multiplexer 2@ to select the current state 16 if the address is in the first flow (the flow that contains the conditional branch), or the previous state if the address is in the second flow (the flow that contains the BRANCH PREVIOUS). In operation, when a conditional branch has been set for an address of a first flow, the next address in this flow will be input into latch 10d. If the condition to the branch was not satisfied, then the destination address will not be altered by the OR-gate 24 and the address will go to the control store 30. In the meantime, the address of the second flow has been input and proceeds as the first flow does, with the addresses from the first and second flows being interleaved as described earlier.

When a branching state has passed the mask 12 and therefore satisfies the branching condition desired by the first flow, instead of merely passing on the destination address pointed to by the address in the first flow, multiplexer control line 22 carries the signal from the control store 30 to cause the current state to be ORed at OR-gate 24 with the destination address. This changes the destination address in the first flow so that the first flow will branch to the changed destination address. The destination address pointed to by the address in the second flow of the instruction having the BRANCH PREVIOUS set, arrives at the OR-gate 24 one cycle after the destination address from the first flow arrived. The signal from multiplexer control line 22 to multiplexer 20 causes the previous (or saved) branch state, which was on line 16 one cycle earlier as the current state and is now on line 18, to be ORed with the destination address from the second flow. This changes the destination address in the second flow so that the second flow also branches to the changed destination address in the second flow. Both flows have now branched on the same condition, and have therefore been kept together.

By saving dynamic state for one cycle, then using this saved state to cause the second flow to branch, both flows effectively branch together and the program will remain together, making programming easier for the programmer.

Microsubroutine calls and returns are handled analogously to the above-described procedure. When a microsubroutine is called, the calling address is put onto a FIFO stack 34, as seen in FIG. 2. In order to keep the two flows together, when the first flow calls a microsubroutine, the second flow also calls a microsubroutine. The two microsubroutines are interleaved.

A situation can occur during a microsubroutine which causes an error, such as when a microsubroutine is to calculate division by zero. In that case, a first flow may return out of the microsubroutine, passing the error status back to the caller, and it is important to make the second flow also return out with the same error status. The present invention accomplishes this by multiplexing the calling address from the stack 34 with the next address line 26, using a multiplexer 36. There are two paths the calling address from the stack 34 can take to the multiplexer 36. The first is through one latch 10f, while the second path is parallel to the first and is through three latches 10 g, h, j. Thus, when there is a return from a microsubroutine, the call address is popped off the stack 34 and is fed through both paths to the multiplexer 36. The mux control 22 causes the multiplexer 36 to first select the input from the first path and in the next cycle to select the input from the second path. The three latches 10 g, h, j delay the call address along the second path. Thus, the first flow uses the call address from the stack 34 which is on the first data path, and the second flow will have that same call address a cycle later, since it will take the call address from the second delayed path. The two call addresses are each modified in turn to give return addresses to cause the two flows to return from their respective microsubroutines.

In the foregoing specification, the invention has been described with reference to a specific exemplary embodiment thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An arrangement in a computer for conditionally changing destination addresses of an interleaved computer program having first and second instruction flows and conditional branching, said computer having branch states, and said arrangement comprising:
   means for sensing a branch state of said computer to determine if said branch state satisfies a branch condition of said program, said branch state that is sensed being a sensed branch state;
   means for changing a destination address of an instruction in a first instruction flow in response to satisfaction of said branch condition by said sensed branch state, said means for changing being coupled to said means for sensing; and
   means for saving said sensed branch state and changing a destination address of an instruction from a second instruction flow in response to satisfaction of said branch condition by said sensed branch state said sensed branch state that is saved being a saved sensed branch state, said means for saving being coupled to said means for sensing.

2. The arrangement of claim 1, wherein said means for saving includes delay latches connected to said means for sensing, and a multiplexer connected to said delay latches, said delay latches saving said sensed branch state for at least one machine cycle and then inputting said saved sensed branch state to a first input of said multiplexer.

3. The arrangement of claim 2, wherein said means for changing a destination address of an instruction in said first instruction flow includes said multiplexer and a current state line connected between a second input of said multiplexer and said means for sensing, said current state line inputting said sensed branch state to said second multiplexer input at least one machine cycle before said saved sensed branch state is inputted into said multiplexer.

4. The arrangement of claim 3, wherein said multiplexer includes an output and is controllable to selectively output either said sensed branch state or said saved sensed branch state.

5. The arrangement of claim 4, wherein said means for changing the destination address of an instruction in said means for saving include means for combining the output of said multiplexer with the destination addresses of instructions in said first and second instruction flows to produce changed destination addresses.

6. The arrangement of claim 5, wherein said means for combining include an OR-gate with a first input coupled to said output of said multiplexer, a second input for receiving said destination addresses and an output for outputting said changed destination addresses and said destination addresses which remain unchanged.

7. The arrangement of claim 6, further comprising a control store connected to said OR-gate output for receiving said unchanged and said changed destination addresses and outputting a new destination address to said OR-gate and a multiplexer control signal to selectively control the output of said multiplexer.

8. The arrangement of claim 7, wherein said multiplexer control signal causes said multiplexer to output said sensed branch state if a new destination address outputted to said OR-gate is a destination address of an instruction in said first instruction flow, and said saved sensed branch state if said new destination address outputted to said OR-gate is a destination address of an instruction in said second instruction flow.

9. The arrangement of claim 1, further comprising a means for inputting a call address from a stack to said means for changing a destination address, means for inputting said call address to said means for changing a destination address after a time delay and means for selecting between the means for inputting a call address after a time delay and the means for inputting the call address.

10. A method for conditionally branching both first and second flows of an interleaved computer program in a computer having branch states, the method comprising the steps of:
   generating a first flow destination address from an instruction in said first flow; changing said first flow destination address if a branch state satisfies a branch condition; saving said branch state for at least one machine cycle to produce a saved branch state;
   generating a second flow destination address from an instruction in said second flow; and changing said second flow destination address if said saved branch state satisfies said branch condition.

11. The method of claim 10, wherein said step of changing said first flow destination address includes combining said first flow destination address with said branch state and said step of charging said second flow destination address includes combining said second flow destination address with said saved branch state, respectively, to change bits in said first flow destination address and second flow destination addresses address.

12. The method of claim 11, wherein said step of combining includes the step of ORing of said first flow destination address or said second flow destination address with one of said branch state and said saved branch state.

13. The method of claim 10, wherein said step of generating a first flow destination address includes the step (a) of obtaining a call address from a microstack, and the step (b) of generating a second flow destination address includes the step of obtaining said call address from said microstack a delayed period of time after step (a).

* * * * *